United States Patent [19]
Nahay

[11] 4,053,722
[45] Oct. 11, 1977

[54] SOLID STATE TWO-WIRE/FOUR-WIRE CONVERTER WITH COMMON BATTERY

[75] Inventor: Lawrence P. Nahay, Cinnaminson, N.J.

[73] Assignee: The United States of America as represented by the Secretary of the Navy, Washington, D.C.

[21] Appl. No.: 729,541

[22] Filed: Oct. 4, 1976

[51] Int. Cl.² .............................................. H04B 1/58
[52] U.S. Cl. ............................................. 179/170 NC
[58] Field of Search ............. 179/81 B, 170 R, 170 D, 179/170 T, 170 NC

[56] References Cited

U.S. PATENT DOCUMENTS

| 3,530,260 | 9/1970 | Gaunt, Jr. | 179/170 NC |
| 3,855,430 | 12/1974 | Colardelle et al. | 179/170 NC |
| 3,973,089 | 8/1976 | Puckette | 179/170 NC |

FOREIGN PATENT DOCUMENTS

| 2,450,853 | 4/1975 | Germany | 179/170 NC |

OTHER PUBLICATIONS

M. A. Patten; "Electronic Hybrid Telephone Line Pack;" IBM Tech. Disclosure Bulletin; vol. 16, No. 4; Sept. 1973; pp. 1173-1174.

Primary Examiner—Kathleen H. Claffy
Assistant Examiner—Randall P. Myers
Attorney, Agent, or Firm—Richard S. Sciascia; Arthur A. McGill; Prithvi C. Lall

[57] ABSTRACT

A hybrid system utilizing a plurality of operational amplifiers provides for appropriate isolation of input and output signalling. A signal initially appearing at the incoming path of the four-wire line appears as a balanced signal at the two-wire input/output end of the system but is effectively canceled from appearing at the output path of the four-wire input/output end. A signal initially placed on the two wire input/output end of the system appears at the output of the four-wire input/output end but is effectively canceled from the input line of the four-wire input/output end. A direct current path for common battery supply of loop current, while maintaining line impedance match over the audio frequency bandwidth is maintained.

2 Claims, 2 Drawing Figures

SOLID STATE TWO-WIRE/FOUR-WIRE CONVERTER WITH COMMON BATTERY

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention generally relates to communication systems and more particularly to a hybrid circuit utilizing a DC loop in which the hybrid circuit provides conduction or isolation between selected paths of two-wire and four-wire lines.

Hybrid systems are well known in the communication field. They are used to connect a two-wire bidirectional balanced transmission path with a four-wire path. If the hybrid system does not have proper canceling parameters, undesirable signals appear on specified lines. For instance, at the four-wire input/output terminals, a signal introduced to the hybrid system at the input terminals must not appear at the output terminals. Furthermore, a signal introduced to the hybrid system at the two-wire input/output terminals should appear at the output terminals but not at the input terminals of the four-wire input/output. The purpose of the system is to have the signals introduced to the system on the input terminals of the four-wire input/output end transmitted only to the two-wire input/output end and the signals introduced at the two-wire input/output end transmitted only to the output lines of the four-wire input/output end. In a system providing a battery supply, the supply appears at the two-wire input/output end and is inhibited from appearing at the four-wire end.

Special balancing transformers and more recently solid state devices have been used to provide the appropriate canceling on previous systems. None of the prior art, however, have accomplished a system as effectively simplistic and capable of miniaturization at the present invention.

SUMMARY OF THE INVENTION

Accordingly, it is a general object and purpose of the present invention to provide an improved hybrid system. Further objects are that the system be reliable, low in cost and adaptable for miniaturization. These and other objects of the invention and the various features and details of construction and operation will become apparent from the specification and drawing.

This is accomplished in accordance with the present invention by providing a transformerless two-wire/four-wire converter circuit using solid state operational amplifiers. The two-wire interface is a balanced termination which provides for simultaneous bidirectional transmission over a balanced transmission wire pair. The four-wire input and output interfaces are shown as single ended terminations. These can be readily converted to balanced circuits using conventional techniques.

A pair of solid state current drivers are provided for receiving the four-wide input signal. The first is driven in a non-inverting manner while the second operates in an inverted manner. This provides balanced push-pull output signals. A balancing amplifier used in conjunction with an appropriate balancing network cancels signals from the four-wire input from appearing at the four-wire output.

An operational amplifier receives the two-wire input signal. The output of this amplifier provides the signal to the four-wire output. A plurality of capacitors prevent the battery supply from appearing at the four-wire input/output end. Well known state-of-the-art devices (not shown) enable the battery to energize a local signalling system when a device such as a telephone at a distant point on the two-wire end switches onto the line.

DESCRIPTION OF THE PREFERRED EMBODIMENTS

Figure 1:
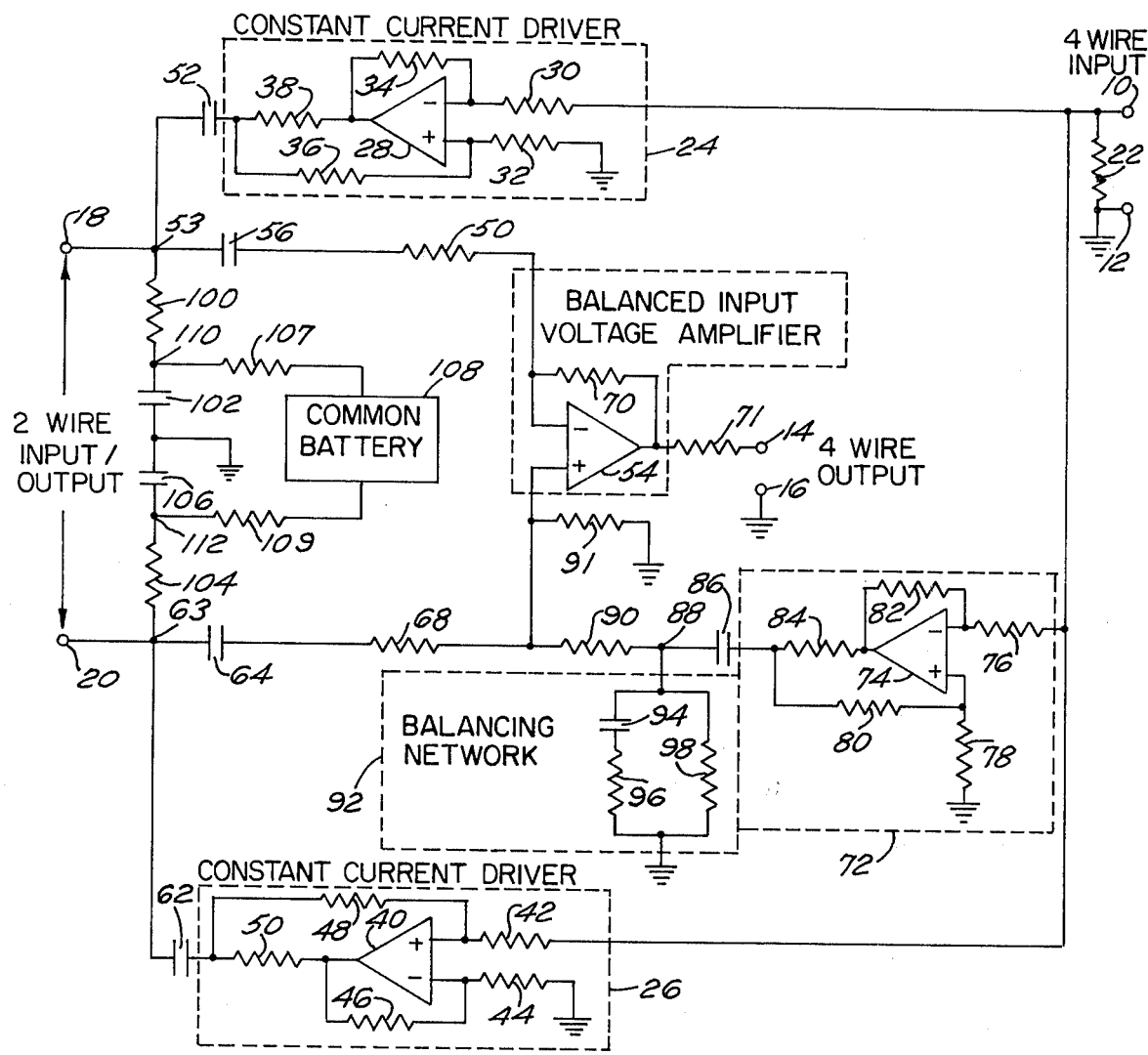
FIG. 1 is a schematic representation of a solid state two-wire/four-wire converter with a common battery.

Referring now to FIG. 1 there is shown the four-wire input/output terminals, with respective numerals 10 and 12 representing the input terminals, and 14 and 16 denoting the output terminals. Numerals 18 and 20 represent the balanced two-wire input/output terminals.

An impedance 22 is connected at the four-wire input between terminal 10 and grounded terminal 12. Constant current drivers 24 and 26 are connected to input terminal 10. Driver 24 is an inverting device comprised of operational amplifier 28, and associated resistors 30, 32, 34, 36 and 38. An input signal from terminal 10 is supplied to the negative terminal of the operational amplifier 28. Driver 26 is a non-inverting device comprised of operational amplifier 40, and associated resistors 42, 44, 46, 48 and 50. An input signal from terminal 10 is supplied to the positive terminal of the operational amplifier 40.

The output of driver 24 is connected to two-wire input/output terminal 18 through capacitor 52 and junction point 53. The output of driver 24 is also connected to the negative terminal of operational amplifier 54 through capacitor 52, junction 53, capacitor 56 and resistor 50. The output of driver 26 is connected to two-wire input/output terminal 20 through capacitor 62, and junction point 63. The output of driver 26 is also connected to the positive terminal of operational amplifier 54 through capacitor 62, junction 63, capacitor 64 and resistor 68. Operational amplifier 54 has a feedback resistor 70 and connects at its output to terminal 14 through resistor 71.

A constant current balancing amplifier 72 receives an input signal from terminal 10. Balancing amplifier 72 is comprised of operational amplifier 74, and associated resistors 76, 78, 80, 82 and 84. The output of amplifier 72 is connected to the positive input terminal of amplifier 54 through capacitor 86, function 88 and resistor 90. The positive input terminal of amplifier 54 is grounded through a resistor 91. Junction 88 is connected to ground through balancing network 92 comprised of capacitor 94 and resistor 96 connected in parallel with resistor 98.

A center tap ground is provided on the two-wire input/output terminals 18 and 20. Terminal 18 is grounded through junction 53, resistor 100, junction 110 and capacitor 102, and terminal 20 is grounded through junction 63, resistor 104, junction 112 and capacitor 106. A loop comprising resistor 107, battery 108 and resistor 109 is connected to junction 110 located between resistor 100 and capacitor 102 and to junction 112 connected between resistor 104 and capacitor 106.

In the operation of the system, a signal received at terminal 10 is supplied to constant current drivers 24 and 26. This results in a balanced signal being received on terminals 18 and 20. This would also tend to supply a balanced signal to amplifier 54 resulting in an undesired transmission of the signal to terminal 14. However, the signal applied to terminal 10 is also supplied to inverting amplifier 72 and this amplifier 72 in conjunction with balancing network 92 and associated resistors results in the signal being applied to the positive terminal of amplifier 54 being equal to the signal supplied to the amplifier 54 negative terminal. This provides effective cancellation. The choice of the size of the components to affect this cancellation is well within the skill of those in the art.

A voice signal applied to terminals 18 and 20 is applied to balanced input voltage amplifier 54. The amplifier 54 provides an output signal to terminal 14. The voice signal applied to terminals 18 and 20 is blocked from appearing at terminal 10 by drivers 24, 26, and 72 which inherently provide a high impedance in the reverse direction.

A system (not shown) appearing on output terminals 18 and 20 receives power from common battery 108 for signalling purposes.

Figure 2:
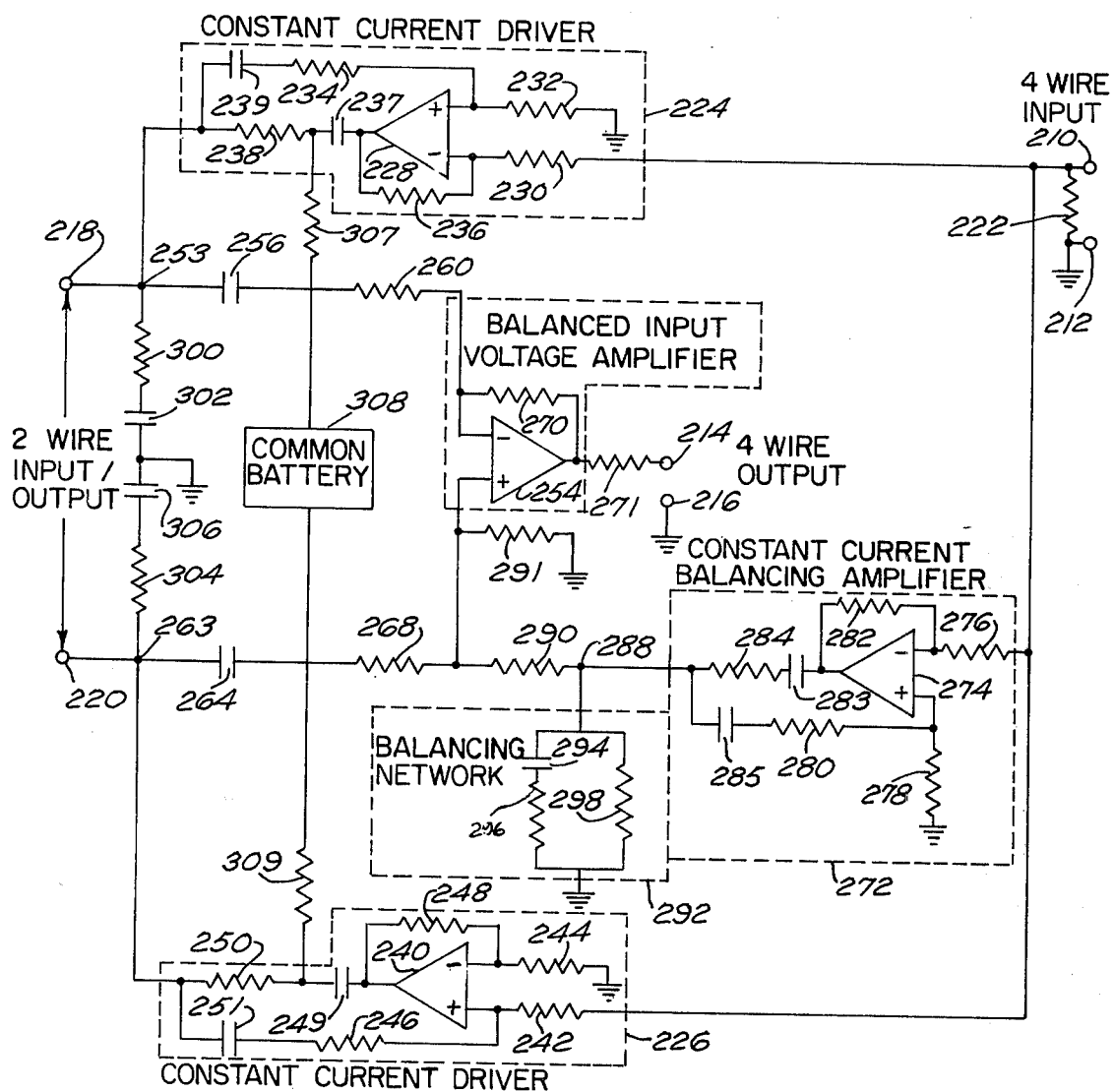
FIG. 2 is an alternate configuration of a schematic representation of a solid state two-wire/four-wire converter with a common battery.

FIG. 2 shows an alternate embodiment of the present invention. The four-wire input/output terminals are 210, 212, 214 and 216, and the two wire input/output terminals are 218 and 220. Resistor 222 is located across the four-wire input terminals 210 and 212.

Constant current driver 224 is an inverting device with operational amplifier 228, resistors 230, 232, 234, 236 and 238, and capacitors 237 and 239. Constant current driver 226 is non-inverting with operational amplifier 240, resistor 242, 244, 246, 248 and 250, and capacitors 249 and 251.

The output of driver 224 is directly connected to two-wire input/output terminal 218 through junction 253, and connected to the negative terminal of operational amplifier 254 through junction 253, capacitor 256 and resistor 260. The output of driver 226 is directly connected to two-wire input/output terminal 220 through junction 263, and connected to the positive terminal of operational amplifier 254 through junction 263 capacitor 264 and resistor 268. Operational amplifier 254 has a feedback resistor 270 and connects to output terminal 214 through resistor 271.

Constant current balancing amplifier 272 is an inverting device with operational amplifier 274, resistors 276, 278, 280, 282 and 284, and capacitors 283 and 285. Junction 288 connects balancing network 292 to the system. Network 292 has serially connected capacitor 294 and resistor 296 arranged in parallel with resistor 298. The network 292 is grounded at the end opposite junction 288.

The output of amplifier 272 is connected to the positive input terminal of amplifier 254 through resistor 290. The positive input terminal of amplifier 254 is grounded through resistor 291.

A center tap ground is provided on the two-wire input/output terminals 218 and 220 through resistors 300 and 304 and capacitors 302 and 306. A common battery 308 is connected to two-wire input/output terminals 218 and 220 through respective resistors 307 and 238, and 309 and 250. The operation of the device of FIG. 2 is similar to that of FIG. 1.

There has therefore been described transformerless hybrid systems for use in conjunction with a common battery. Conventional components are used throughout the systems.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A two-wire/four-wire converter system comprising:

four-wire input terminals, four-wire output terminals and a pair of two-wire input/output terminals;

an inverting solid state constant current driver and a non-inverting solid state constant current driver, said drivers in combination connected to transmit and balance a signal from said four-wire input terminals to said two-wire input/output terminals;

balancing means for use in inhibiting signals from said four-wire input terminals from appearing at said four-wire output terminals, said balancing means comprising a constant current amplifier having an input connected to said four-wire input terminals and a balancing network connected to the output of said constant current amplifier;

amplifier means connected at its output to said four-wire output terminals, and connected at its input to said inverting constant current driver, said non-inverting constant current driver, said balancing means and said pair of two-wire input/output terminals for transmitting signals originating in the converter system at said two-wire input/output terminals and inhibiting signals originating in the converter system at said four-wire input terminals; and a battery connected to said two-wire input/output terminals.

2. A two-wire/four-wire converter system according to claim 1 wherein each of said inverting solid state constant current driver, non-inverting solid state current driver, constant current amplifier and amplifier means comprises an operational amplifier.

* * * * *